Dec. 27, 1966   J. N. VAN SCOYOC ETAL   3,293,901

DEW POINT INDICATOR

Filed July 13, 1964

INVENTORS
J. N. VAN SCOYOC
D. C. REUKAUF

BY

United States Patent Office 3,293,901
Patented Dec. 27, 1966

3,293,901
DEW POINT INDICATOR
James N. Van Scoyoc, Oak Park, and Donald C. Reukauf, Park Ridge, Ill., assignors to the United States of America as represented by the Secretary of the Air Force
Filed July 13, 1964, Ser. No. 382,425
2 Claims. (Cl. 73—17)

The purpose of this invention is to provide apparatus for automatically and continuously indicating the dew point, or the temperature at which the relative humidity of the air would become 100 percent.

Briefly, the above purpose is accomplished as follows: A sensing element is provided in the form of an insulating surface having two spaced electrodes thereon. When the insulating surface is dry, the resistance between the electrodes is very high; however the condensation of a thin film of moisture on the insulating surface, as would occur if the surface temperature were at the dew point, produces a marked lowering of this resistance. A Peltier cooler is provided to lower the temperature of the sensing element, and a control circuit, including the resistance between the sensor electrodes as an element, is provided for responding to the drop in this resistance that occurs when the sensing element has been cooled to the dew point to stop or reverse the current flow in the Peltier cooler. The sensing element temperature then rises, either naturally or forced by reversing the current through the cooling element, until the moisture film has evaporated, causing its resistance to return to its initial high value which restores current flow through the Peltier element in the cooling direction. Thus the system cycles continuously, causing the temperature of the sensing element to vary about an average value which is the dew point. A suitable temperature indicator, such as one having a thermistor as the sensing element, may be used to measure this average temperature.

Figure 1:
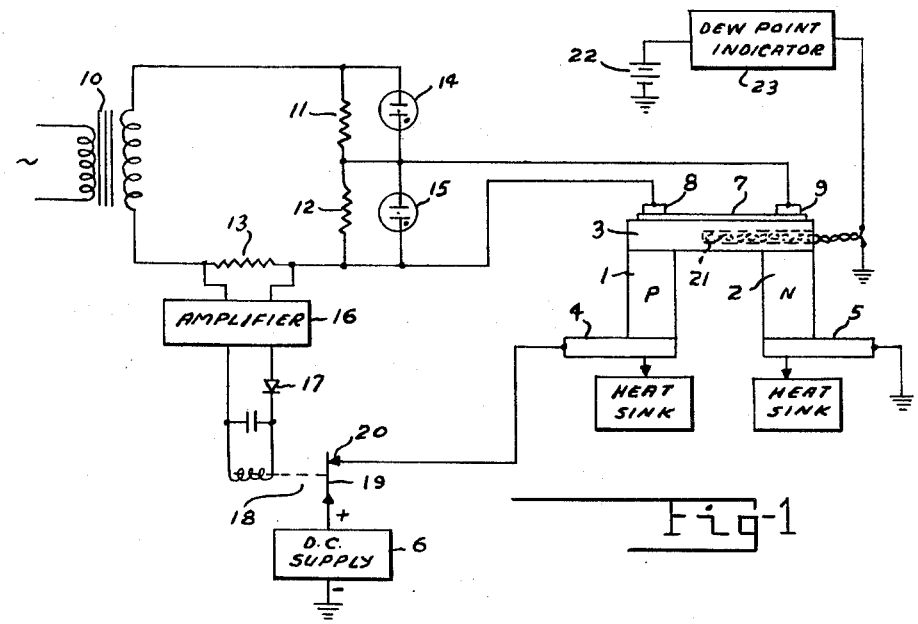
Figure 2:
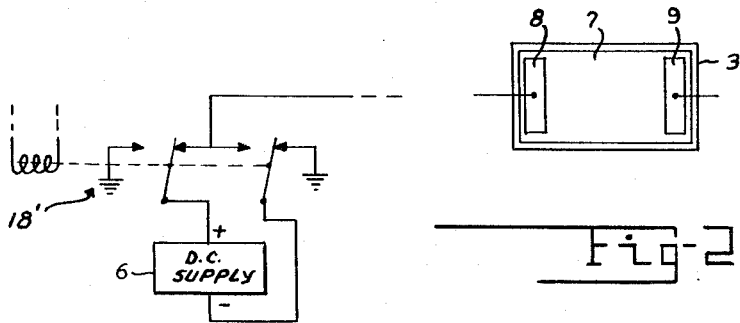
Figure 3:
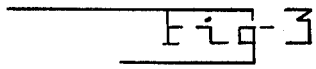

A more detailed explanation of the invention will be given with reference to the specific embodiment thereof shown in in accompanying drawing in which FIG. 1 is a schematic diagram of the dew point indicator, FIG. 2 is a plan view of the sensing element, and FIG. 3 is a modification of FIG. 1 to provide forced heating of the sensing element.

Referring to FIG. 1, a length of p-type material 1 and a length of n-type material 2 form junctions with metallic members 3, 4 and 5. According to the well known Peltier effect, if a direct voltage is applied between elements 4 and 5 of the polarity indicated at source 6, the resulting current flow through the above-mentioned junctions will result in the absorption of heat at junctions 1–3 and 3–2, causing element 3 to be cooled, and the production of heat at junctions 4–1 and 2–5. Suitable heat sinks, indicated at 7 and 8, are usually provided to dissipate the heat generated at the latter junctions. Peltier coolers of this type are well known in the art, one being described, for example, in Patent No. 3,112,648 to Dulk et al.

The dew point sensing element is a thin film of insulating material 7 cemented or otherwise attached in good heat conducting relation to cooling element 3 so as to introduce a minimum of thermal lag between the two. Two electrodes 8 and 9 are in contact with the upper surface of film 7. A one-quarter mil film of Mylar makes a suitable element 7. A plan view of the sensing element is seen in FIG. 2.

A control circuit is provided in which the alternating voltage at the secondary of transformer 10 is applied across the series connected resistors 11, 12 and 13. Resistors 11 and 12, which may be equal, have resistance values that are high relative to resistor 13, low relative to the resistance between electrodes 8 and 9 when the insulating surface is dry, and about comparable to the resistance between these electrodes when there is a film of condensed moisture on the insulating surface. These resistors are shunted by gaseous discharge devices 14 and 15, respectively, which may be small neon lamps. Also, the resistance between electrodes 8 and 9 is connected in parallel to resistor 12. The voltage at the secondary of transformer 10 is so selected that, with a resistance between terminals 8 and 9 that is very high relative to resistance 12, the voltages across resistors 11 and 12 are insufficient to fire lamps 14 and 15.

The voltage developed across resistor 13 by the current flowing in the circuit is amplified in amplifier 16, rectified by diode 17 and applied to the coil of relay 18 having normally closed contacts 19–20. With lamps 14 and 15 extinguished, the current through resistor 13 is limited by resistors 11 and 12 to a low value that produces insufficient input to amplifier 16 to actuate relay 18.

Assume the temperature of elements 3 and 7 to be above the dew point. Under this condition, the surface 7 is free of condensed moisture and the resistance between electrodes 8 and 9 is very high. Therefore, as stated above, lamps 14 and 15 are extinguished and relay 18 is deenergized. Current from source 6 then flows through normally closed contacts 19–20 to the Peltier cooler causing the temperature of element 3 and the insulating film 7 attached thereto to be lowered.

When the temperature of film 7 has been lowered to the dew point, moisture condenses on the surface of the film and markedly lowers the resistance between electrodes 8 and 9. This drops the voltage across resistor 12 and, since the secondary voltage of transformer 10 is substantially constant, raises the voltage across resistor 11 sufficiently to fire lamp 14. The sharp drop in voltage across lamp 14 when it fires causes an equally sharp rise in voltage across resistor 12 which fires lamp 15 almost simultaneously with the firing of lamp 14. This all occurs in the same half-cycle of the applied alternating voltage. Near the end of the half-cycle, as the applied voltage approaches zero, both lamps are extinguished, but fire again in the same manner in the next succeeding half-cycle and for all succeeding half-cycles so long as there is a film of moisture on the surface of film 7.

With lamps 14 and 15 firing each half-cycle, their shunting effect on resistors 11 and 12 increases the current flow in resistor 13 sufficiently to actuate relay 18 and open contacts 19–20. This stops the current flow through the Peltier cooler and allows element 3 and insulator 7 to rise in temperature. As the temperature rises above the dew point, the film of condensed moisture on the surface of insulator 7 evaporates restoring the original high resistance between electrodes 8 and 9. As stated earlier, under this condition the alternating voltages across resistors 11 and 12 are insufficient to fire lamps 14 and 15. Consequently, the current through resistor 13 is reduced and relay 18 is deenergized. This allows contacts 19–20 to close restoring the current flow through the Peltier cooler and initiating a new cycle of operation.

Therefore, the temperature of element 3 and the attached insulating film 7 oscillates about an average value which is the dew point. Any suitable means may be used to measure and indicate this average temperature. For example, a thermistor probe 21 may be inserted inside element 3 and connected in series with a source of current 22 and a current indicator 23 calibrated to read temperature.

If desired, the rise in temperature of elements 3 and 7 may be forced rather than allowed to occur naturally. For this purpose, FIG. 1 may be modified as shown in FIG. 3 by substituting relay 18' for relay 18. Actuation of relay 18' reverses the direction of current flow through the Peltier cooler, causing heat to be generated, rather than absorbed, at junctions 1–3 and 3–2. Also, the surface of insulating film 7 may be coated with a hydroscopic material if desired to produce a more pronounced resistance change.

We claim:

1. A dew point indicator comprising: means providing an insulating surface; a pair of spaced electrodes on said insulating surface; normally operative means for cooling said insulating surface; a substantially constant voltage alternating current source; a current sensing device and a pair of substantially equal resistors connected in series across said source, each resistor having a resistance value comparable to the resistance between said electrodes when there is a film of condensed moisture on said insulating surface; means directly connecting said electrodes to the ends of one of said resistors; a gaseous discharge device connected in shunt to one of said resistors and a similar gaseous discharge device connected in shunt to the other of said resistors, said discharge devices having firing voltages somewhat higher than the alternating voltages across said resistors when said insulating surface is dry; means including said current sensing device responsive to the alternating current supplied by said source for rendering said cooling means inoperative when said current is above a predetermined value; and means for indicating the average temperature of said insulating surface.

2. A dew point indicator comprising: means providing an insulating surface; a pair of spaced electrodes on said surface; a Peltier cooler in heat conducting relation to said means providing an insulating surface for cooling said surface; a source of direct current and a normally closed switching means connected in series with said Peltier cooler for supplying current thereto; a substantially constant voltage alternating current source; a current sensing device and a pair of substantially equal resistors connected in series across said alternating current source, each resistor having a resistance value comparable to the resistance between said electrodes when there is a film of condensed moisture on said insulating surface; means directly connecting said electrodes to the ends of one of said resistors; a gaseous discharge device connected in shunt to one of said resistors and a similar gaseous discharge device connected in shunt to the other of said resistors, said discharge devices having firing voltages somewhat higher than the alternating voltages across said resistors when said insulating surface is dry; means including said current sensing device responsive to the current supplied by said alternating current source for opening said switching means when said current is above a predetermined value; and means for indicating the average temperature of said insulating surface.

References Cited by the Examiner

UNITED STATES PATENTS

| 2,435,895 | 2/1948 | McIlvaine | 73—17 |
| 3,107,324 | 10/1963 | Wright et al. | 62—3 X |
| 3,131,545 | 5/1964 | Gross et al. | 62—3 |
| 3,152,451 | 10/1964 | Downs | 62—3 |

FOREIGN PATENTS 954,909  4/1964  Great Britain.

RICHARD C. QUEISSER, *Primary Examiner.*

JACK C. GOLDSTEIN, *Assistant Examiner.*